(12) United States Patent
Bobko et al.

(10) Patent No.: US 10,159,217 B2
(45) Date of Patent: Dec. 25, 2018

(54) METHODS OF FABRICATING A BOOT FOR PROMOTING HEALING OF ANIMAL FOOT OR HOOF

(71) Applicants: Christine Bobko, Lakewood, CO (US); Brian Teasdale, Lakewood, CO (US); Landon Meier, Denver, CO (US)

(72) Inventors: Christine Bobko, Lakewood, CO (US); Brian Teasdale, Lakewood, CO (US); Landon Meier, Denver, CO (US)

( * ) Notice: Subject to any disclaimer, the term of this patent is extended or adjusted under 35 U.S.C. 154(b) by 215 days.

(21) Appl. No.: 14/951,947

(22) Filed: Nov. 25, 2015

(65) Prior Publication Data

US 2016/0143250 A1     May 26, 2016

Related U.S. Application Data

(60) Provisional application No. 62/085,175, filed on Nov. 26, 2014.

(51) Int. Cl.
| | | |
|---|---|---|
| A01K 13/00 | (2006.01) | |
| B29D 35/02 | (2010.01) | |
| B29C 43/18 | (2006.01) | |
| B29K 75/00 | (2006.01) | |

(52) U.S. Cl.
CPC ............ *A01K 13/007* (2013.01); *B29C 43/18* (2013.01); *B29D 35/02* (2013.01); *B29C 43/183* (2013.01); *B29K 2075/00* (2013.01)

(58) Field of Classification Search
CPC ...... A01K 13/007; B29D 35/02; B29C 43/18; B29C 43/183; B29C 2043/185; B29C 2043/189; Y10T 29/4998; Y10T 29/49982
See application file for complete search history.

(56) References Cited

U.S. PATENT DOCUMENTS

| | | | |
|---|---|---|---|
| 615,437 A * | 12/1898 | Dillon | A01K 13/007 |
| | | | 168/2 |
| 630,310 A * | 8/1899 | Agnew | A01K 13/007 |
| | | | 168/2 |
| 3,193,984 A * | 7/1965 | Schubert | A01K 13/007 |
| | | | 128/DIG. 20 |
| 4,399,595 A | 8/1983 | Yoon | |
| 4,565,250 A | 1/1986 | Vasko | |
| 4,981,010 A * | 1/1991 | Orza | A01K 13/007 |
| | | | 168/18 |
| 5,441,015 A | 8/1995 | Farley | |
| 7,762,048 B1 | 7/2010 | LeCompte | |
| 8,480,604 B2 | 7/2013 | Messer | |
| 2010/0016991 A1 | 1/2010 | Hellberg | |
| 2010/0276163 A1 | 11/2010 | Berghorn | |

(Continued)

FOREIGN PATENT DOCUMENTS

| | | |
|---|---|---|
| JP | 2005334622 A | 12/2005 |
| WO | WO2012027311 A2 | 3/2012 |

(Continued)

*Primary Examiner* — Jermie Cozart
(74) *Attorney, Agent, or Firm* — Leyendecker & Lemire, LLC

(57) ABSTRACT

A form fit therapy boot along with methods of fabricating the boot for animals (including zoo animals, domestic animals and farm animals) to treat foot and/or hoof injuries is described. Embodiments of the boot permit the maintenance of a clean, reasonably sterile environment surrounding a wound or infection.

9 Claims, 17 Drawing Sheets

(56) References Cited

U.S. PATENT DOCUMENTS

2012/0005925 A1   1/2012   Aho
2014/0259763 A1   9/2014   Rady
2014/0260126 A1   9/2014   Riley
2014/0296764 A1   10/2014  Kenndoff

FOREIGN PATENT DOCUMENTS

WO   WO2013045390 A1   4/2013
WO   WO2014138790 A1   9/2014

* cited by examiner

METHODS OF FABRICATING A BOOT FOR PROMOTING HEALING OF ANIMAL FOOT OR HOOF

RELATED APPLICATIONS

This application claims priority to and incorporates by reference in its entirety U.S. provisional patent application No. 62/085,175 filed on Nov. 26, 2014 entitled "A Method of Treating the Feet/Hooves of Animals Including the Process of Fabricating an Associated Boot and the Boot Itself" having at least one common inventor as the present application.

BACKGROUND

Infections in or proximate a hoof or foot of an animal, including livestock, domestic animals and zoo animals can be difficult to treat. In the case of zoo animals, including Pachyderms generally and Rhinoceroses specifically, an infected hoof is constantly and continually exposed to mud, dirt and even excrement, which hinders healing. Traditionally, an infected hoof often means eventual death for an infected Rhinoceroses.

Traditional bandaging or even boots, which can keep the infected area clean and promote healing, are often not effective many animals especially larger and stronger animals, such the aforementioned Rhinoceros and on the domestic side, horses, who through various means will often destructively remove the protective covering as it irritates or bothers them. Accordingly, prior art methods involve repeatedly cleaning and disinfecting the hoof or foot and usually repeatedly fighting any new infections that arise. Ideally, placing the affected animal in a cleaner environment free of potential containments would help, but practically this is often not possible especially with larger animals. Even when kept in a much cleaner environment little can be done to keep the animal away from its own excrement, which itself can aggravate an infection.

Ultimately, treating a hoof infection on large animals, and certain more moderately sized animals as well, has involved a large amount of luck.

DETAILED DESCRIPTION

Figure 1A:
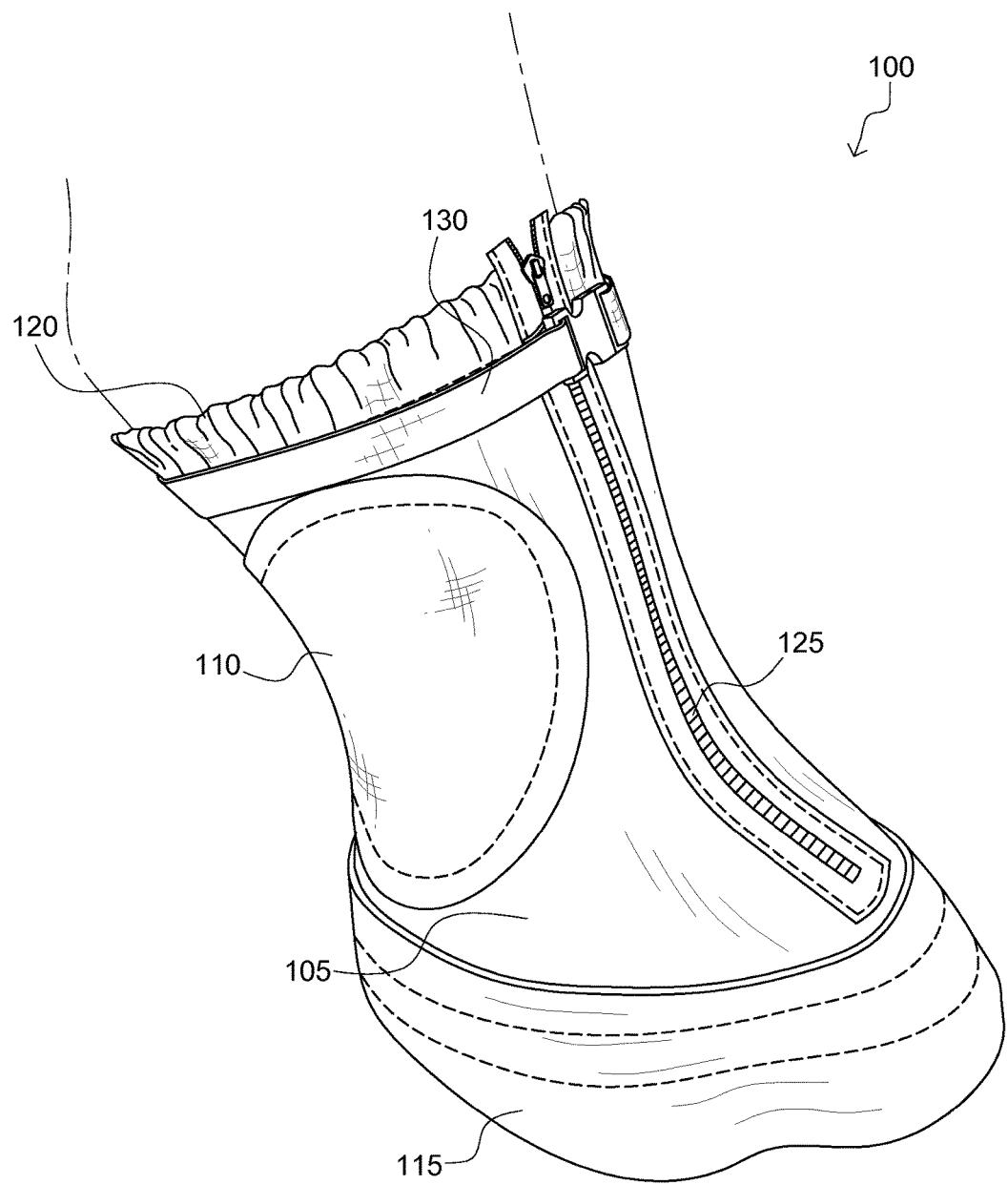
FIG. 1a is an isometric front view of a boot for use on a hoofed animal according to a first embodiment of the present invention.
Figure 1B:
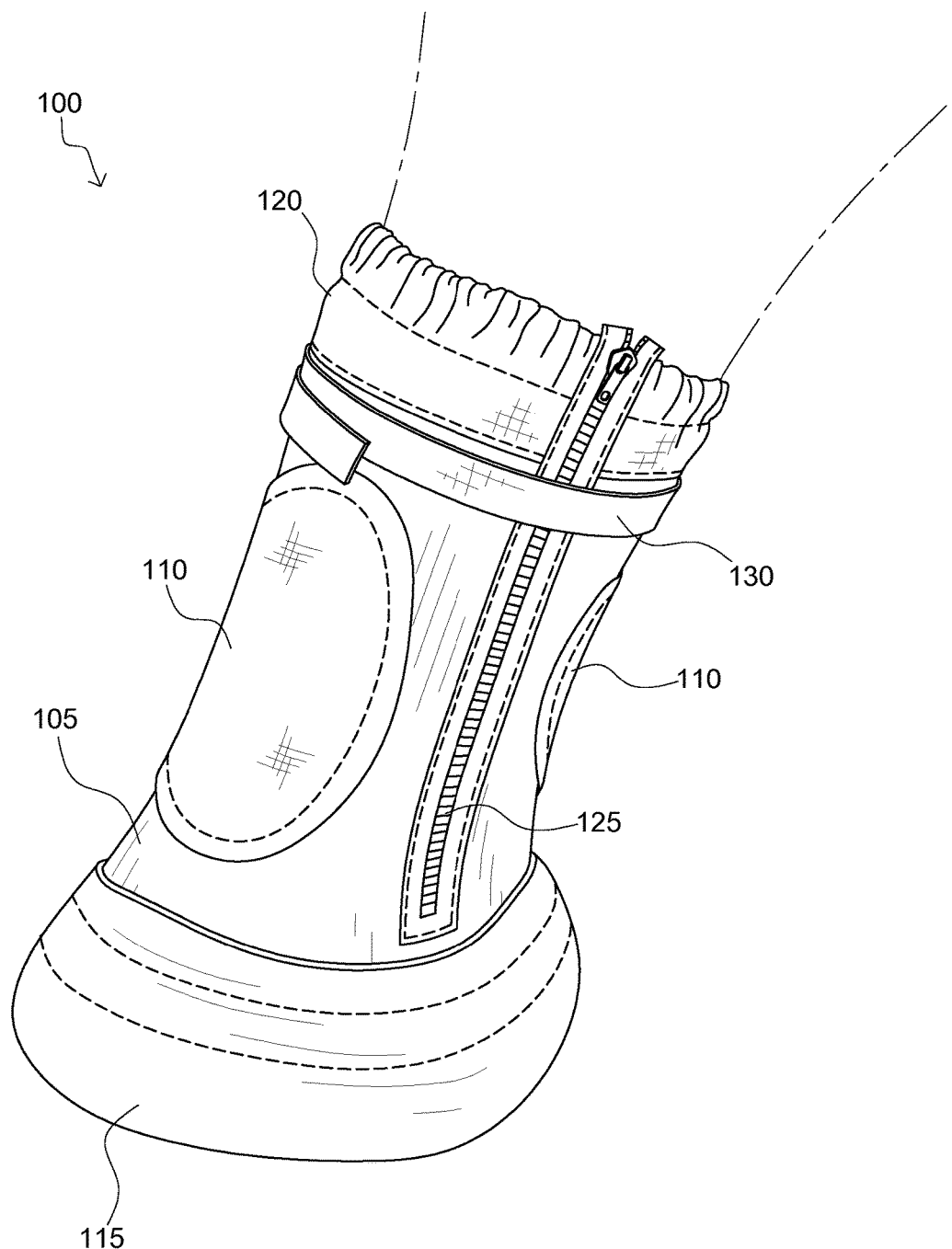
FIG. 1b is an isometric rear view of the boot for use on a hoofed animal according to the first embodiment of the present invention.

Embodiments of the present invention or inventions comprises many different aspects of a therapy boot and methods of fabricating the boot for animals with foot or hoof injuries (including zoo animals, domestic animals and farm animals). Embodiments of the boot permit the maintenance of a clean, reasonably sterile environment surrounding a wound or infection.

Embodiments of the therapy boot are specifically form fit to a particular animal's foot and/or leg. The boot, because it is fit nearly exactly to the subject animal out of a soft and pliable elastomeric material, typically silicone, it does not irritate the animal as much as prior art boots and dressings. Further, because the boot is form fit and close fitting, it is also much more difficult for the animal to remove it forcibly.

In use, the boot protects the foot from environmental contaminants such as unsanitary water and fecal matter that may carry bacteria that could infect a wound or sore and hinder healing. Variations of the boot include water impervious breathable gaiters and/or fabric panels that allow the foot to breath and maintain internal conditions suitable for healing.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The terms "couple" or "coupled," as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally," "near," and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As used herein, the term "elastomeric" is a used to describe a polymeric material having rubber-like properties i.e. an elastomer. The term is used to refer to materials that are both natural and synthetic rubbers. Some elastomeric materials that may be used herein in the fabrication of the therapy boots and some of the molds include but are not limited to silicone and latex.

The term "resin" as used herein refers to an uncured polymeric material typically, but not always necessarily except when circumstances dictate, comprises a liquid.

The term "fibrous" is used herein to describe a material comprised of fibers as can be used to reinforce the elastomeric material comprising the boot. The fibers of the fibrous material may be aligned and woven into a fabric, they can comprise a mat consisting of randomly arranged fibers, they can comprise unwoven fibers that are aligned in a particular manner, or any combination thereof. possible reinforcing fibers include but are not limited to fiberglass, Nylon and Aramid fiber. The fibers can be treated, such as with a sizing, to facilitate adherence to the a particular resin.

The phrase "polymeric tread layer" refers to a layer of material having properties and characteristics making it more suitable than the underlying elastomeric material comprising the boot's body to be in contact with the ground surface. In particular, the material is tougher and more wear resistant than the boot's elastomeric material. In several embodiments of the present invention, a urethane materials is specified as the polymeric tread layer. Of particular note, the "polymeric tread layer" need not have any particular pattern on the bottom side and may be essentially smooth.

The phrase "form fit" as used herein refers to the fit of the boot relative to the foot and in some embodiments the lower portion of the leg of a particular animal. Particularly, a "form fit" boot is one in which at least a portion of interior of the boot is constructed based substantially and specifically on the form of the animal's foot and/or leg.

The term "gaiter" as used herein refers to the portion of an embodiment of the boot that extends above the portion or body of the boot comprising the elastomeric material. Typically, the gaiter provides for additional protection of the underlying leg and foot from potential environmental contaminants, such as dirt, fecal matter and water. In some embodiments when provided in conjunction with straps the gaiter may also be used to assist in securing the boot to the animal's foot and leg.

The phrase "breathable water impervious material, panel or fabric" describes a material, or as used herein "a panel" comprised of such a material that allows gas such as air and water vapor to pass through it but does not permit liquid water to pass therethrough. Gore-Tex fabric made by W. L. Gore and associates is the trademark for such a material.

As used herein a "zipper assembly" refers to an assembly of right and left sides that are joined by (i) a series of interlocking mating projections, (ii) interlocking groove and ridge (i.e. a ziplock), or any other equivalent structure that joins elongated left and right halves togethor.

As used herein, a "magnetic strip assembly" refers to a zipper-like device wherein the left and right sides, which also include outwardly extending flanges, are joined together by magnets in place of interlocking mating projections or the like. In at least one variation configured for use with silicone resin, a series of rare earth magnets are encapsulated in a silicone elastomer with the elastomer also forming the left and right outwardly extending flanges.

The terms "foot" and "hoof" are used interchangeably herein and the use of one is not intended to exclude the other.

A First Embodiment of a Form Fit Therapy Boot for an Animal

FIGS. 1a-e illustrate a first embodiment of a therapy boot 100 configured to protect the foot or hoof of an animal. the particular illustrations are of an embodiment of the boot form fit to the hoof of a rhinoceros, although boots of similar design and construction are suitable for use with many other animals including, but not limited to, other pachyderms, horses and dogs.

While variations are contemplated that are produced in several standard sizes for a particular type of animal, the illustrated embodiments and the methods described herein pertain primarily to boots that are form fit specifically to a particular animal. Custom form fit boots fit a particular animal more tightly and securely, and advantageously, reduce the probability that the animal will forcibly be able to remove the boots and exposed an injured foot to environmental contaminants.

The first embodiment boot 100 comprises the following primary components: a body 105 comprised of an elastomeric material with panels 110 of a breathable water impervious material provided in some variations and including one or more zipper assemblies 125 to facilitate placement and removal of the boot from the animal's foot; a tough polymeric tread layer 115 covering the bottom side of the body; and a flexible, typically fabric, gaiter 120 extending upwardly from a top edge of the body to provide additional environmental protection.

In at least one variation, the elastomeric material comprising the body 105 is silicone. The body can be formed in any suitable fashion including being brushed on a form or mold in resin form, or being injected or poured as a resin into a preconfigured mold cavity. Other elastomeric materials can be used in place of silicone including latex and suitable formulations of urethane. Fillers can be added to the resin to strengthen and toughen it. For example, suitable fillers include fumed silica and short fibers of fiberglass, aramid or carbon.

Typically, but not necessarily, the body is comprised of two types of silicone; wherein, a thickness of material comprised of a supersoft silicone, such as Ecoflex® supersoft rubber by Smooth-On, inc of East Texas, Pa., is provided directly underneath an animal's foot to provide additional cushioning. The primary silicone rubber utilized over the supersoft silicone layer and for the sides of the boot is chosen to provide the necessary strength and integrity to the boot. One suitable silicone rubber resin is Smooth Sil 945 by Smooth-On, inc of East Texas, Pa.

The body 105 can be but is not necessarily reinforced with a continuous fibrous material in the form of a fabric or an unwoven mat. The fiber material can comprise fiberglass, nylon, aramid fiber or any other suitable material. The fibrous material is usually encapsulated in the resin and hidden from view in the finished boot.

Figure 1C:
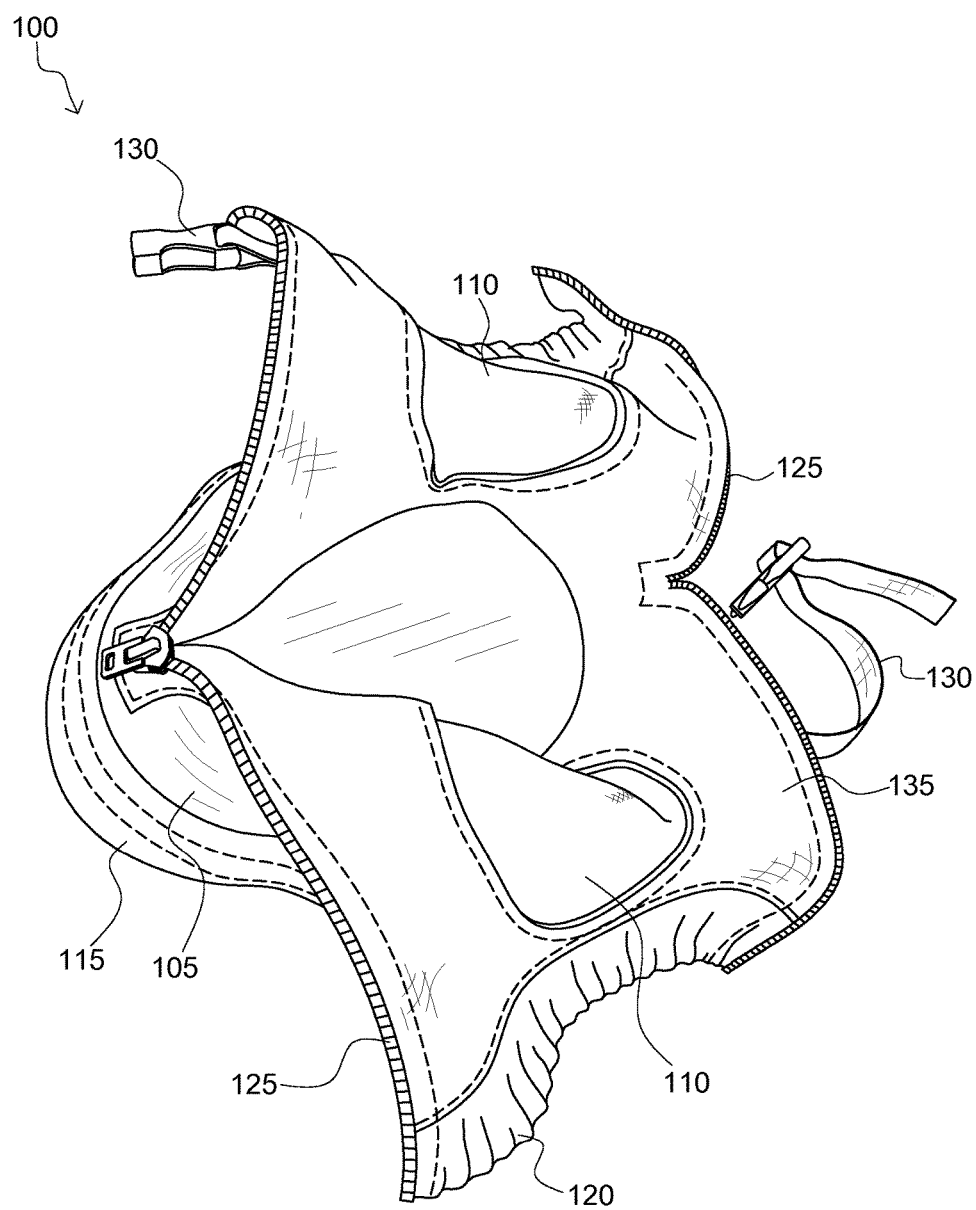
FIG. 1c is an isometric top view of the boot for use on a hoofed animal with the boot splayed open to reveal the interior thereof according to the first embodiment of the present invention.
Figure 1D:
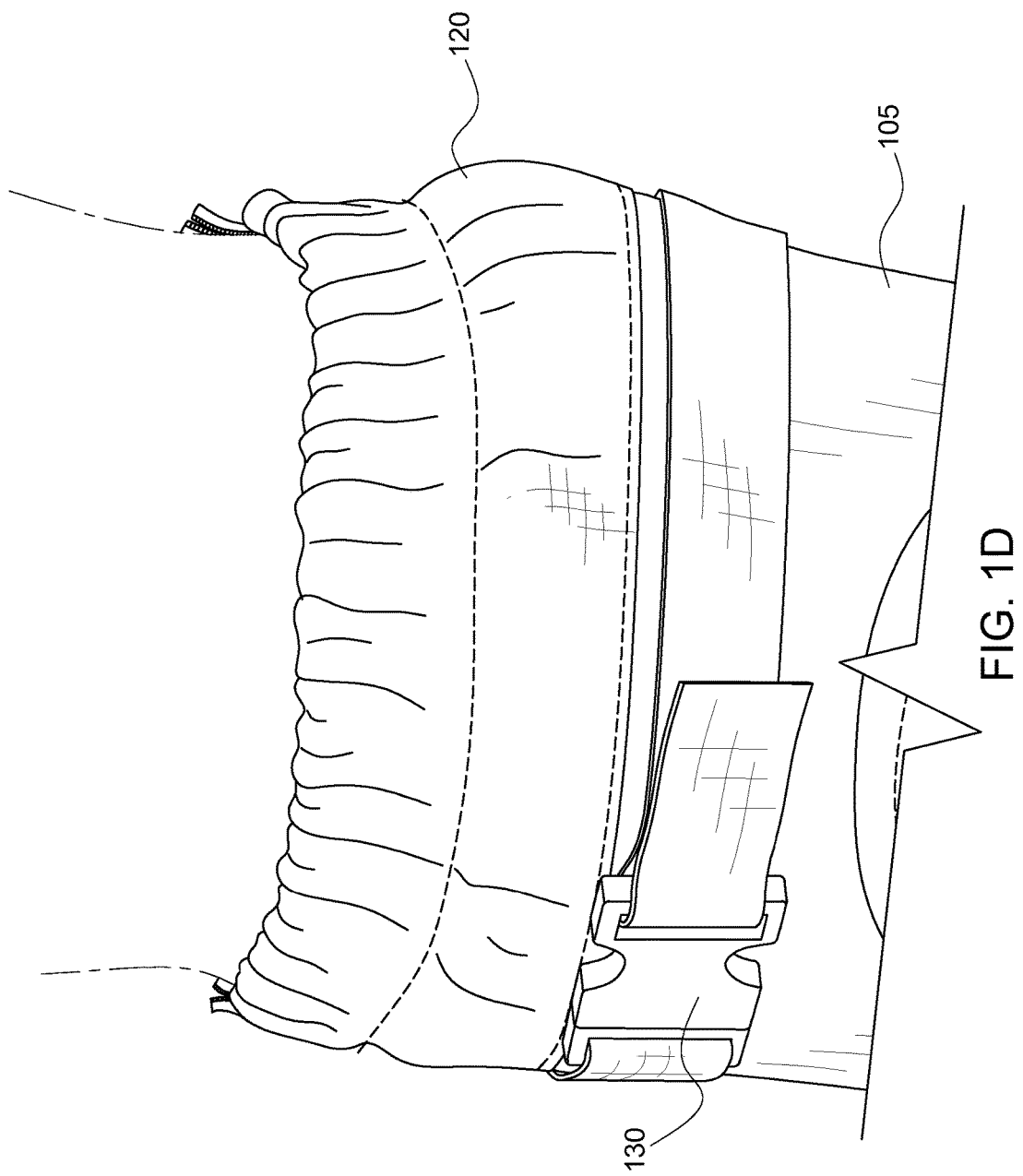
FIG. 1d is an isometric partial close up view of the boot and in particular the gaiter and a portion of the strap assembly according to the first embodiment of the present invention.
Figure 1E:
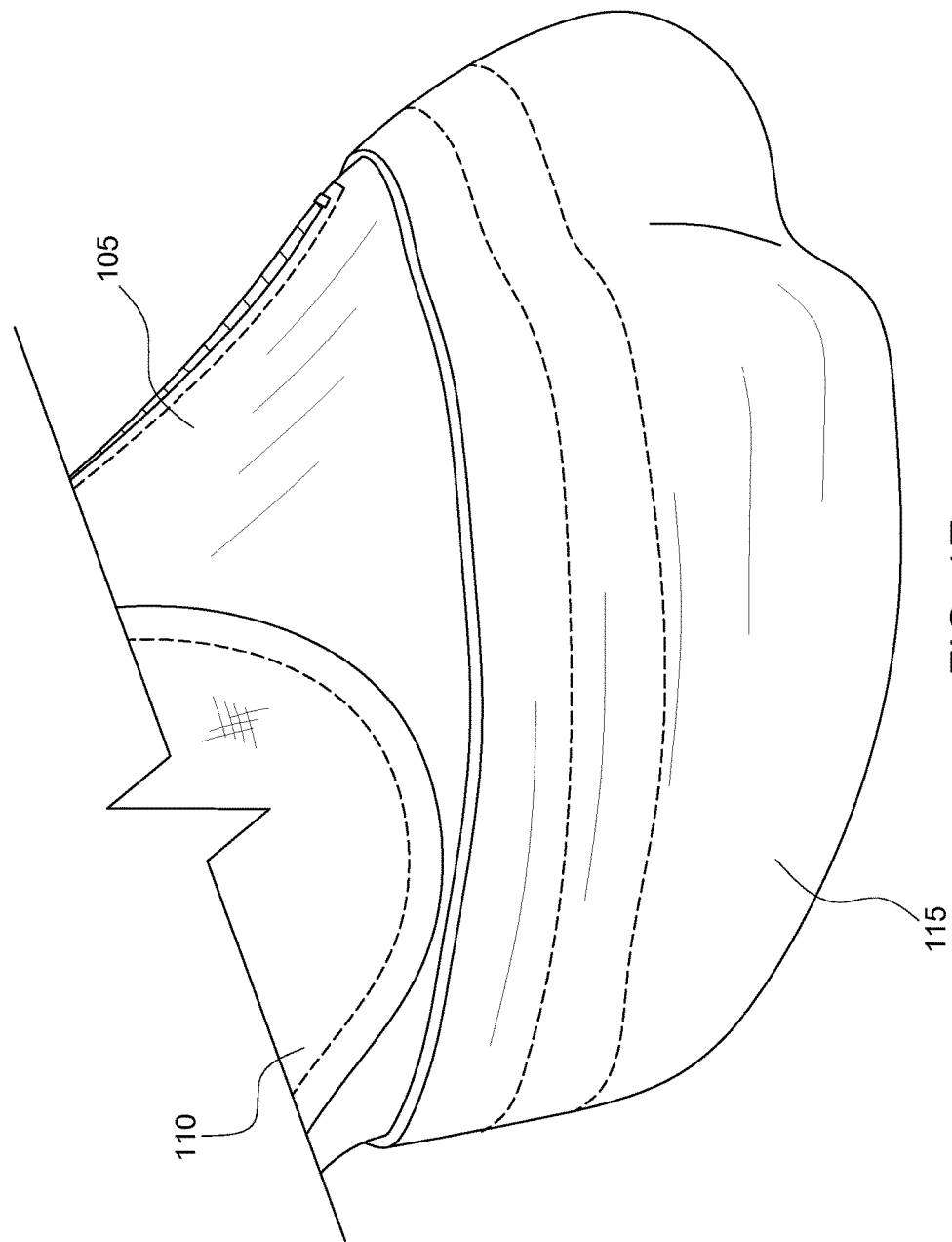
FIG. 1e is an isometric partial close up view of the boot and in particular the tread layer according to the first embodiment of the present invention.

The body also typically includes one or more zipper assemblies 125 that extend generally vertically from a top edge of the body to a point corresponding to a location where the leg transitions into a hoof or foot on the animal intended to wear the boot. In the illustrated example for a rhinoceros, a pair of zipper assemblies are provided: one in the rear or back of the body and one in the front of the body. Accordingly, a zookeeper can splay the boot open as generally illustrated in FIG. 1c to slip the boot easily over the animal's hoof and then zip the zipper assemblies closed to secure the upper portion of the boot around the lower portion of the leg. Of important note, the zipper assembly may extend into the gaiter 120 as shown.

The zipper assemblies 125 may comprises any suitable configuration and design but in at least some variations the zipper assembly comprises a water resistant or waterproof zipper to provide further protection from environmental contaminants coming into contact with the foot. In many instances, however, a standard zipper assembly is suitable since the primary purpose of the boot is to keep the bottom portions of the foot from coming into direct contact with dirty water.

The zipper assembly 125 can be attached to the body by a variety of means but most often a combination of adhesive bonding to provide the best possible seal and sewing to provide strength is used.

Provided on the left and right sides of the boot 100 are cutouts in the body covered with panels 115 comprised of breathable water impervious material. Variations are possible that do not have the panels as are variations that have only one panel, more than two panels and panels in different locations. The panels are typically sewn and adhesively sealed to the sides of the cutout.

In some variations of the body the interior of the boot is lined with a fleece or similar material to enhance the fit of the boot, provide moisture wicking and improve comfort. The interior lining 135 is best illustrated in FIG. 1c.

Also provided on the body 105 near its top edge is a strap and buckle assembly 130. The strap is sewn to the body in one or more locations and provides additional means to secure the boot to the leg proximate its opening. Typically, a nylon or similar strap is provided with a click-type buckle. In addition to helping seal and secure the top edge opening of the boot around the animal's leg, it also acts to prevent the zipper pulls from working themselves downwardly thereby undoing the zipper assemblies 125 and loosening the boot by acting as a stop underneath which the pulls cannot easily move.

Because the silicone elastomeric material comprising the body 105 often does not have the abrasion resistance or toughness to withstand being walked on and run in especially on the type of terrain that might be encountered in the daily activities of an animal wearing the boot, a tough abrasion resistant tread layer 115 is added to the bottom of the body. As shown the layer rises above the bottom and covers a portion of the side of the boot's body as well.

The tread layer on the illustrated boot comprises polyurethane although other materials can be used as well. The tread layer is typically applied to the boot after the body has been cured. In one variation, the tread layer can be added by one of several means including brushing on urethane resin, dipping the body in liquid urethane resin, forming sheets of semi-cured moldable resin around the body, or placing securing a fully cured cap over the bottom. When an uncured resin or partially cured sheets are utilized the adhesive properties of the resin or sheet may, but not necessarily, bond to the body during cure. However, because many silicone materials are notoriously difficult to get to bond with other materials, the top edge of the tread layer can be sewn to prevent the tread layer from peeling off even if the tread layer begins to or partially delaminates from the underlying body.

Along the top edge of the body 105, a gaiter 120 typically comprised of a breathable water impervious fabric is provided. As shown, the gaiter is comprised of left and right pieces that are joined together in use by way of the zipper assemblies 125 that continue from the top edge of the body upwardly to the top edges of the gaiter pieces. The top edges of the gaiter pieces comprise an elastic strip that causes the top edge of the gaiter when the zipper assemblies are closed to encircle and maintain contact with the leg of the animal. The gaiter adds a level of protection to the boot against the infiltration of debris into the boot.

A Second Embodiment of a Form Fit Therapy Boot for an Animal

Figure 2A:
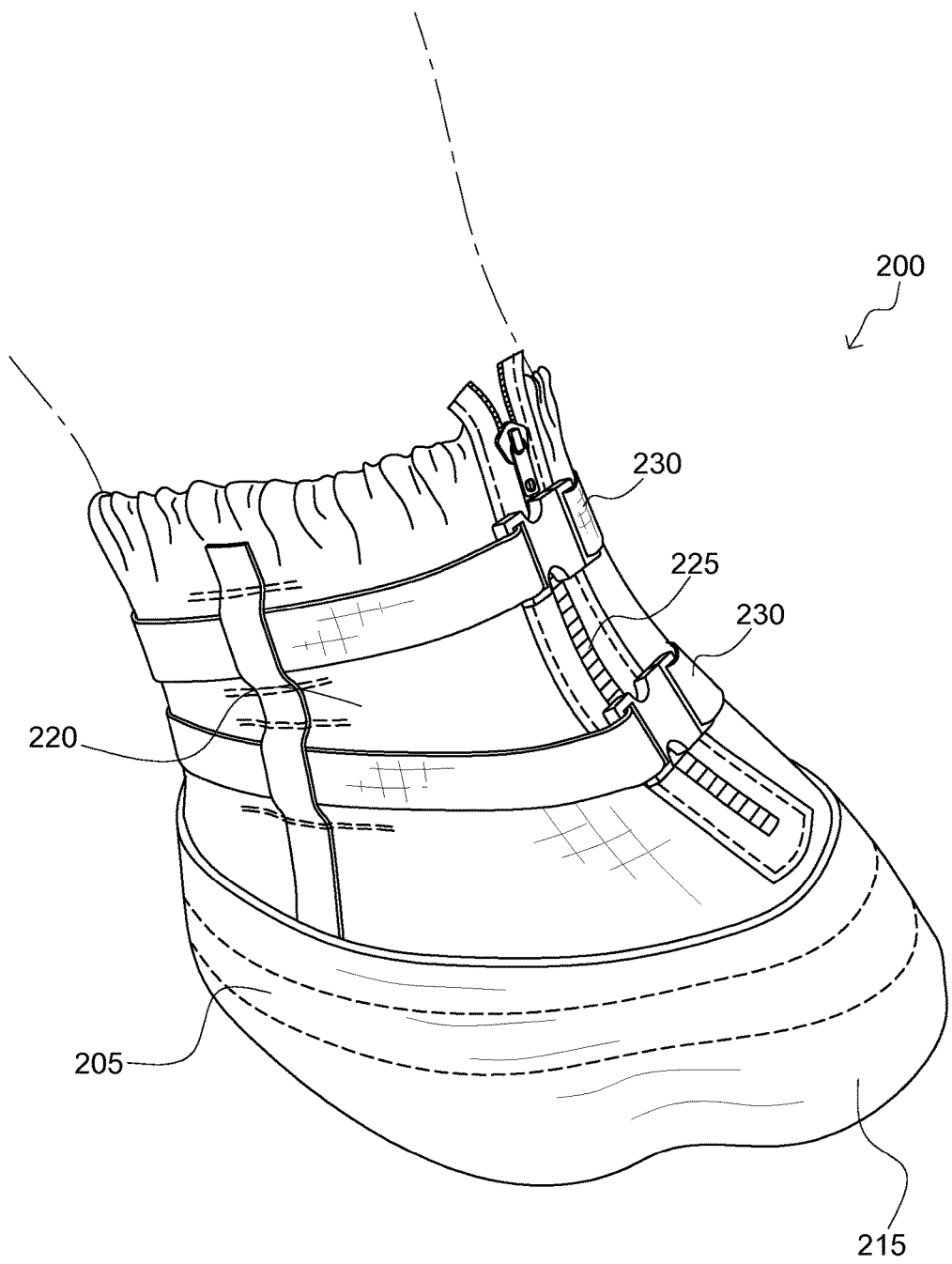
FIG. 2a is an isometric front view of a boot for use on a hoofed animal according to a second embodiment of the present invention.
Figure 2B:
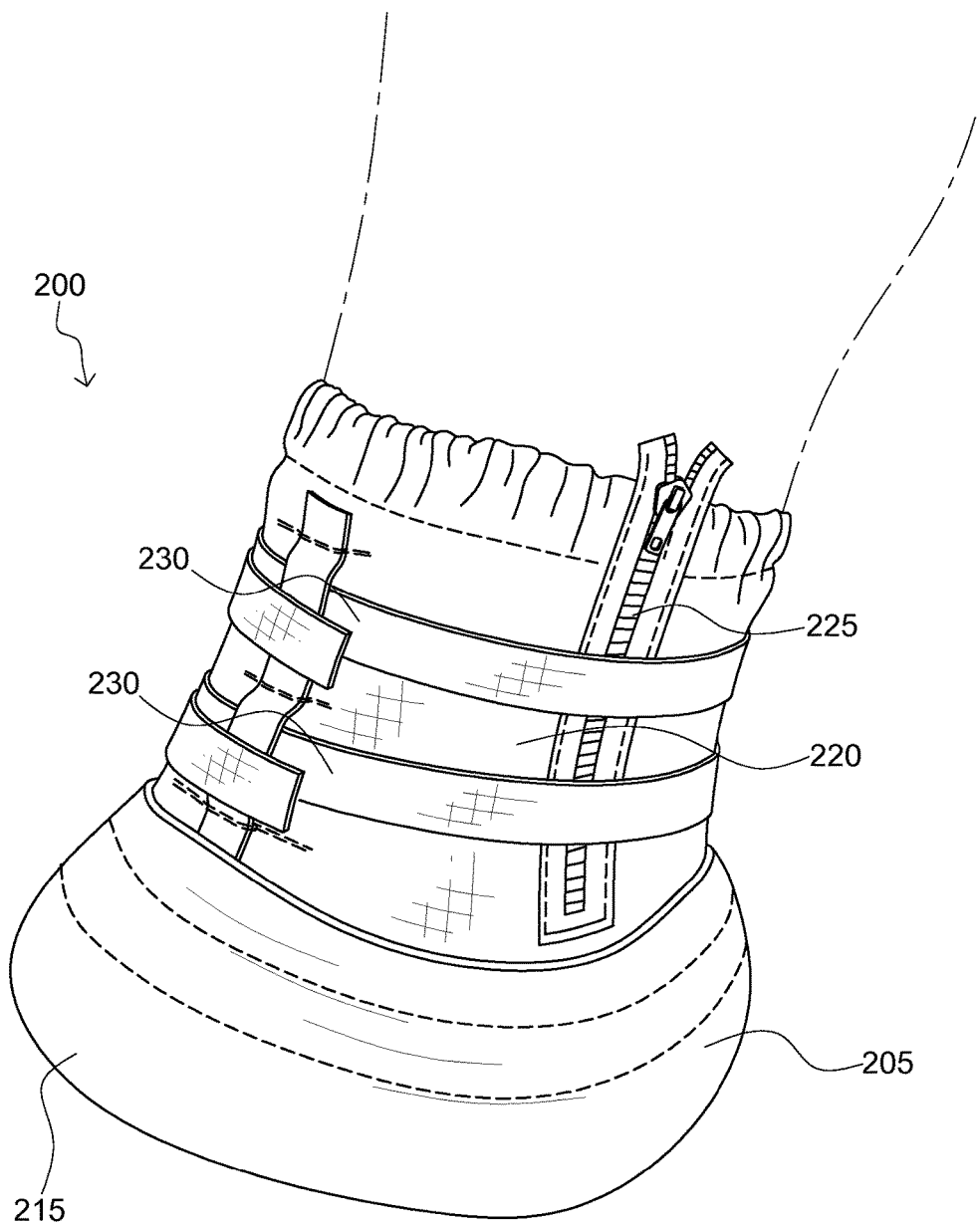
FIG. 2b is an isometric rear view of the boot for use on a hoofed animal according to the second embodiment of the present invention.
Figure 2C:
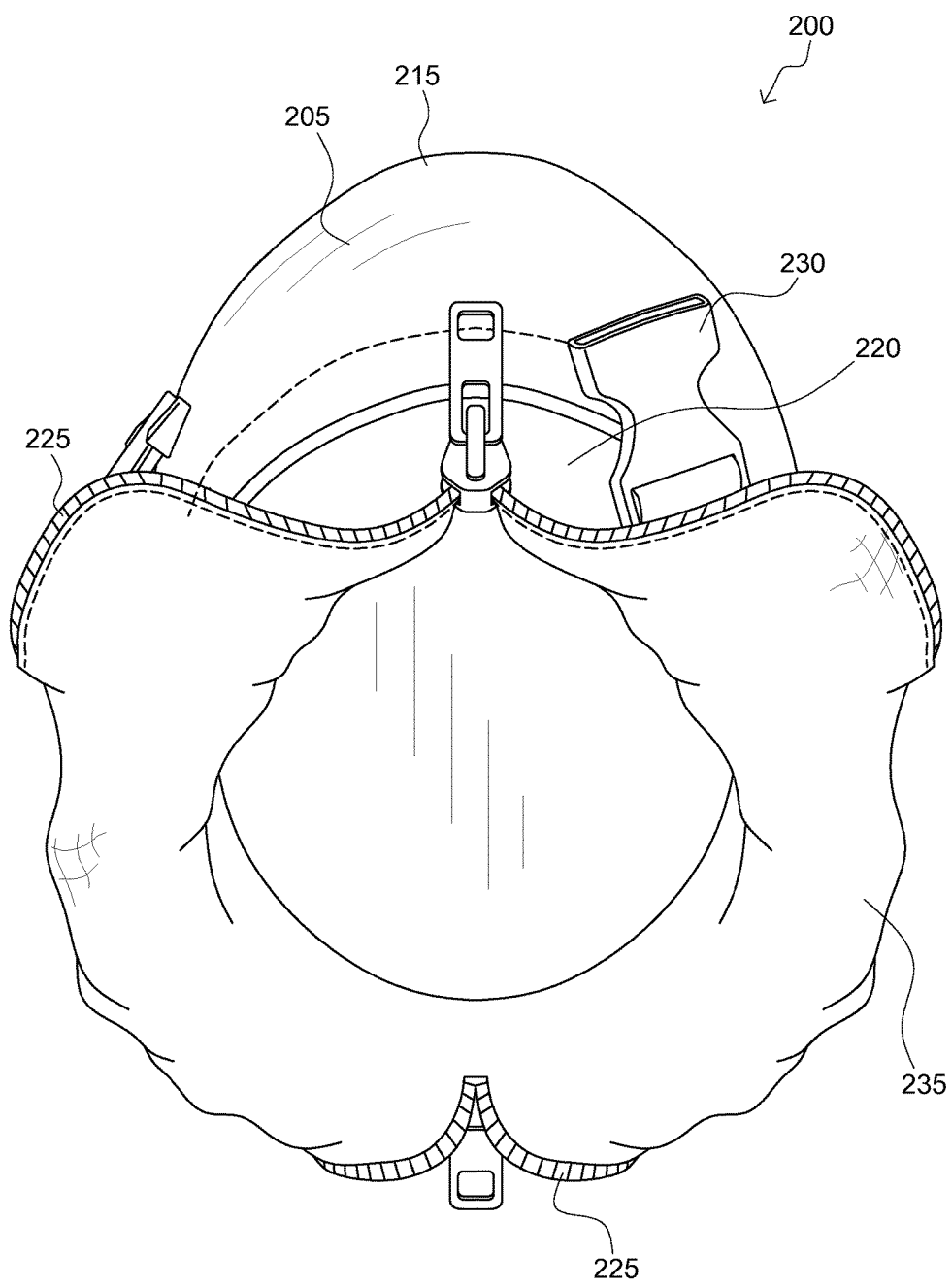
FIG. 2c is an isometric top view of the boot for use on a hoofed animal with the boot splayed open to reveal the interior thereof according to the second embodiment of the present invention.

FIGS. 2a-c illustrate a second embodiment of a therapy boot 200 configured to protect the foot or hoof of an animal. The particular illustrations are of a boot form fit to the hoof of a rhinoceros, although boots of similar design and construction are suitable for use with many other animals including, but not limited to, other pachyderms, horses and dogs.

The second embodiment boot differs from the first embodiment primarily in the configuration of its body 205, which only extends upwardly over only a portion of the foot instead of completely over the foot and upwardly onto the leg. Additionally, the second embodiment relies on a gaiter 220 with associated strap assemblies 230 to help hold and secure the boot in place on an animal. Like the first embodiment boot, the second embodiment boot 200 comprises the following primary components: the body comprised of an elastomeric material; a tough polymeric tread layer 215 covering most if not substantially all of the body; and the fabric gaiter, which extends upwardly from a top edge of the body and includes one or more zipper assemblies 225 and strap assemblies 230.

In at least one variation, the elastomeric material comprising the body 205 is silicone. The body can be formed in any suitable fashion including being brushed on a form or mold in resin form, or being injected or poured as a resin into a preconfigured mold cavity. other elastomeric materials can be used in place of silicone including latex and suitable formulations of urethane. Fillers can be added to the resin to strengthen and toughen it. For example, suitable fillers include fumed silica and short fibers of fiberglass.

Typically, but not necessarily, the body is comprised of two types of silicone; wherein, a thickness of material comprised of a supersoft silicone, such as Ecoflex® 50 supersoft rubber by Smooth-On, inc of East Texas, Pa., is provided directly underneath an animal's foot to provide additional cushioning. The primary silicone rubber utilized over the supersoft silicone layer and for the sides of the boot is chosen to provide the necessary strength and integrity to the boot. One suitable silicone rubber resin is Smooth Sil 945 by Smooth-On, inc of East Texas, Pa.

The body 205 can be, but is not necessarily, reinforced with a continuous fibrous material in the form of a fabric or an unwoven mat. The fiber material can comprise fiberglass, nylon, aramid fiber or any other suitable material. The fibrous material is usually encapsulated in the resin and hidden from view in the finished boot.

The gaiter 220, typically comprised of a breathable water impervious fabric, extends upwardly from the top edge of the body to which it is securely attached and sealed. As mentioned above the elastomeric body's top edge usually terminates in a location proximate the side of the foot of the animal for which it is made and the gaiter extends upwardly over the remainder of the foot and over the lower portion of the leg. As shown, the gaiter is comprised of left and right pieces that are joined together in use by way of the zipper assembly 225 that begins proximate the top edge of the body and continues to and often beyond the top edges of the gaiter. In other variations, a single piece gaiter can be used with a single front, rear or side zipper assembly instead of two. The top edges of the gaiter pieces comprise an enclosed elastic strap that causes the top edge of the gaiter when the zipper assemblies are closed to encircle and maintain contact with the leg of the animal.

The zipper assemblies 225 may comprises any suitable configuration and design but in at least some variations the zipper assembly comprises a water resistant or waterproof zipper to provide further protection from environmental contaminants coming into contact with the foot. In many instances, however, a standard zipper assembly is suitable since the primary purpose of the boot is to keep the bottom portions of the foot from coming into direct contact with dirty water.

The zipper assemblies 225 can be attached to the gaiter by a variety of means but most often a combination of adhesive bonding to provide the best possible seal and sewing to provide strength is used.

Upper and lower strap assemblies 230 are provided attached to the gaiter to assist in securing the boot to the animal. Typically, a nylon or similar strap is provided with a click-type buckle. In addition to helping seal and secure the boot to the animal's leg, the upper assembly also acts to prevent the zipper pulls from working themselves downwardly thereby undoing the zipper assemblies and loosening the boot by acting as a stop underneath which the pulls cannot easily move.

In some variations of the body the interior of the boot is lined with a fleece or similar material to enhance the fit of the boot, provide moisture wicking and improve comfort. The interior lining 235 is best illustrated in FIG. 2c.

Because the silicone elastomeric material comprising the body 205 does not typically have the abrasion resistance or toughness to withstand being walked on and run in especially on the type of terrain that might be encountered in the daily activities of an animal wearing the boot, a tough abrasion resistant tread layer 215 is added to the bottom of the body. As shown the layer rises above the bottom and covers a portion of the side of the boot's body as well.

The tread layer on illustrated boot comprises polyurethane although other materials can be used as well. The tread layer is typically applied to the boot after the body has been cured. In one variation, the tread layer can be added by one of several means including brushing on urethane resin, dipping the body in liquid urethane resin, forming sheets of semi-cured moldable resin around the body, or securing a fully cured cap over the bottom. When an uncured resin or partially cured sheets are utilized the adhesive properties of the resin or sheet typically bond lightly to the body during cure. However, because many silicone materials are notoriously difficult to get to bond with other materials, the top edge of the tread layer can be sewn to prevent the tread layer from peeling off even if the tread layer separates from the underlying body.

A First Embodiment Method of Fabricating a Facsimile of an Animal's Foot/Hoof

Figure 3:
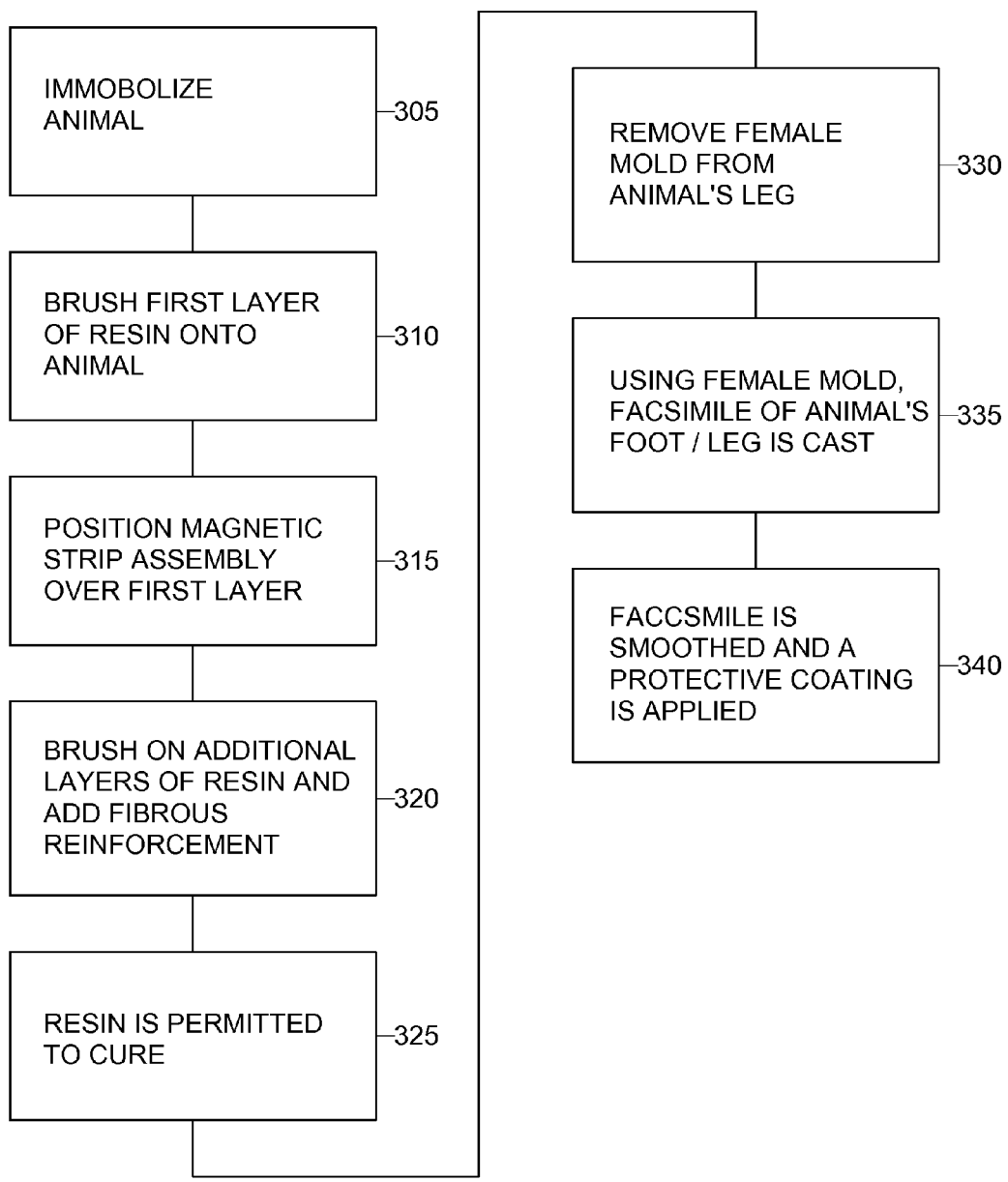
FIG. 3 is a flow chart showing a first method of fabricating a facsimile of an animal's foot or hoof according to an embodiment of the present invention.

With reference to the flow chart of FIG. 3, the process of creating a facsimile of an animal's foot and lower leg is described. Initially, the animal or at the very least the leg of the animal is immobilized as shown in block 305. Depending the type of animal and its temperament, this may require placing the animal under an anesthetic. In other instances, especially with domesticated animals, merely soothing the animal may be sufficient.

As necessary, the animal's foot and lower portion of its leg may be coated with a suitable release agent or material that does not harm the animal and does not hinder the cure of elastomeric resin, but also assists in the release of the cured elastomer from the foot. Possible suitable agents include wax and certain oils. In yet other instances, the portion of the leg and foot to be encapsulated is shaved to remove fur that could otherwise hinder the success of the molding process.

Referring to block 310, an uncured elastomeric resin is brushed onto the animal's foot and leg. Preferably a rapid cure silicone resin is utilized that cures to a solid consistency in 10 minutes or less and preferably 5 minutes or less from the mixing of the resin with a suitable catalyst. The speed at which the resin cures often necessitates more than one person participating in the mold making process. Depending on the consistency and type of resin utilized one or more layers may be applied letting each layer at least partially cure before the next layer is added. Typically, however, the first layer or set of layers is intended to be relatively thin.

Figure 4:
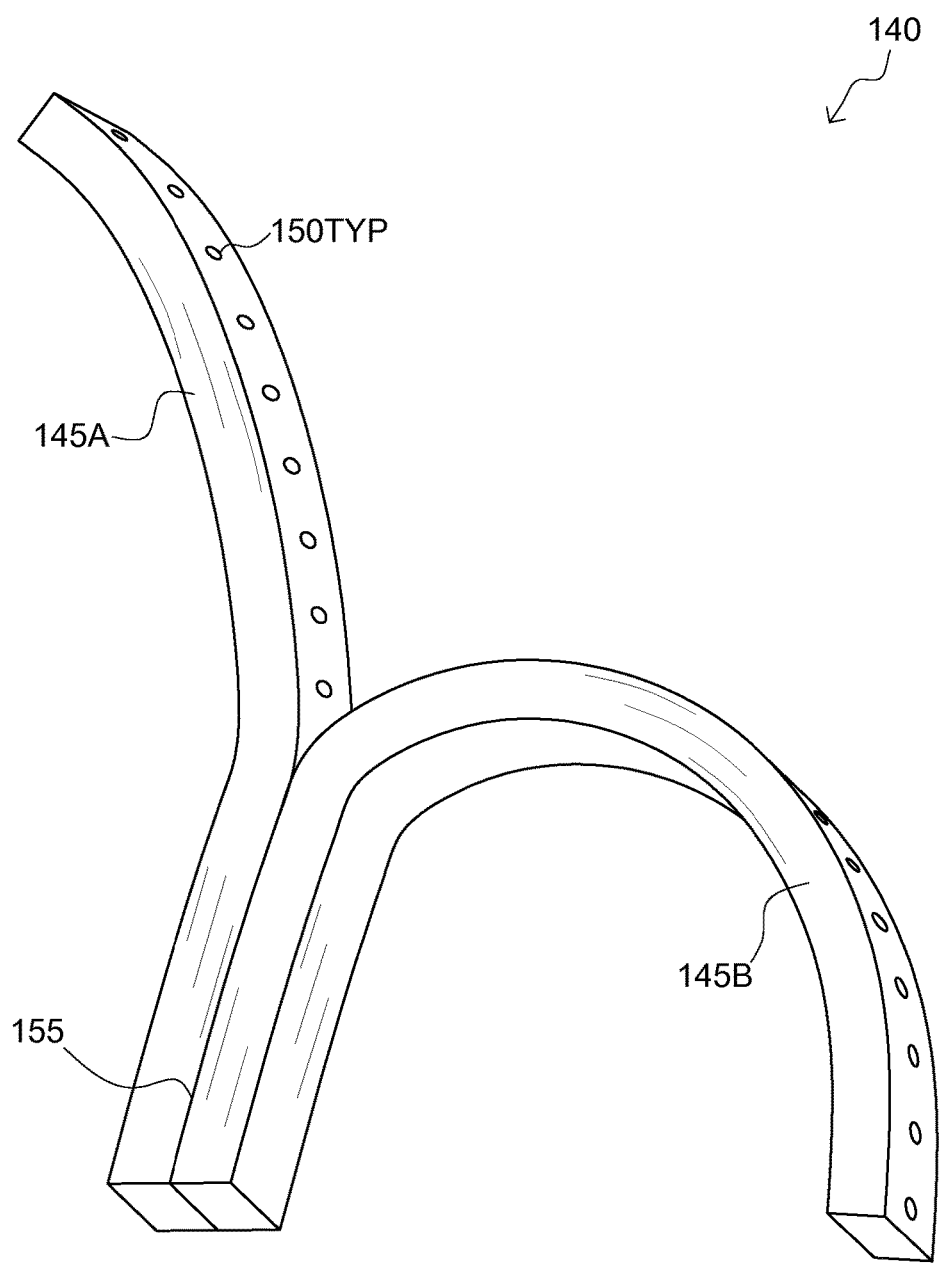
FIG. 4 is an isometric view of a silicone magnetic strip assembly used in the first method of fabricating a facsimile of an animal's foot or hoof according to an embodiment of the present invention.

In block 315, one or more elongated magnetic strip assemblies 140 are placed against the last layer of applied resin before it has had the opportunity to fully cure. A typical magnetic strip assembly is illustrated in FIG. 4. In particular, the left and right flanges 145a&b having rare earth magnets 150 contained therein are pressed into the layer to ensure they will adequately adhere to the resin. As is of relevance below, by pulling apart the strip at its longitudinally extending magnetic interface 155 the left and right sections can be separated.

Next as indicated in block 320, additional layers of resin are added over the top of previously brushed and cured layers until the thickness of the casting is considered sufficient. Care is taken to avoid brushing over the seam of the magnetic strip(s). In certain variations, pieces of impregnated fibrous material, such as a fiberglass fabric, is also placed into, over and within the layers.

Referring to blocks 325 and 330, after all the layers have been added with or without reinforcement the mold is permitted to cure, any silicone spanning the seam between the left and right sections of each magnetic strips is cut as necessary, the magnetic strips are separated, and the mold is removed from the animal's foot. Preferably, with the use of rapid cure resins, the entire foot molding process is completed within 30-60 minutes.

Once removed, the molding is prepared for the casting of a facsimile of the animal's foot by applying a suitable release agent as necessary and reconnecting the left and right sections of each magnetic strip. As indicated in block 335, the facsimile is cast by pouring a suitable casting material, such as plaster, into the mold and permitting the plaster to cure. Once cured, the sections of the magnetic strips are again separated and the facsimile is removed.

To prepare the facsimile for boot fabrication as indicated in block 340, the surface of the casting is smoothed out through sanding removing any sharp edges or jutting portions that could cause discomfort to the animal if reproduced in the boot. Once smoothed, the entire facsimile is coated with epoxy resin to fill in any surface porosity and enhance the surface integrity of the facsimile.

A Second Embodiment Method of Fabricating a Facsimile of an Animal's Foot/Hoof

Figure 5A:
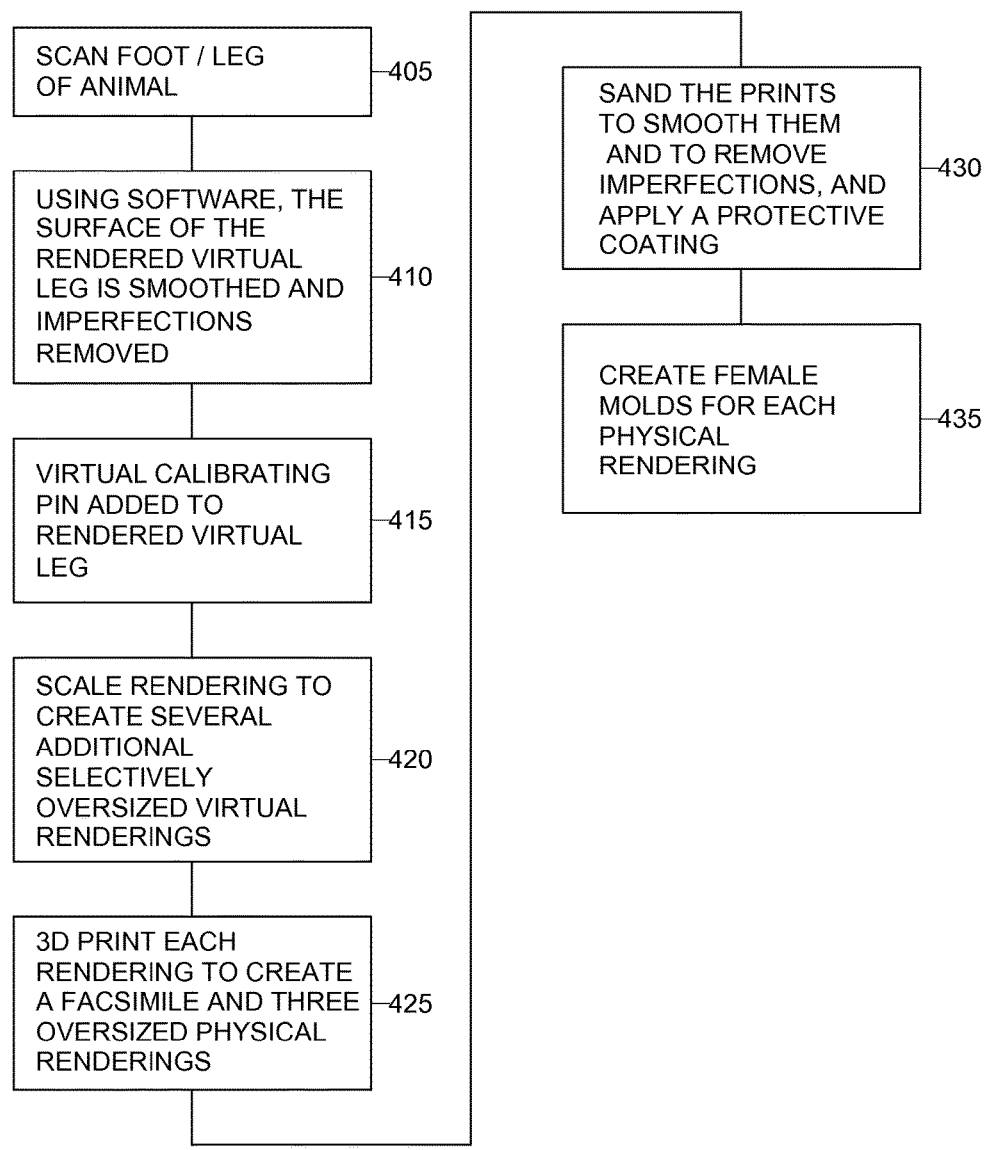
FIG. 5a is a flow chart showing a second method of fabricating a facsimile of an animal's foot or hoof according to an embodiment of the present invention.

With reference to FIG. 5a, a second method of creating a facsimile of an animal's foot or hoof is described. As indicated in block 405, the animals foot is scanned typically using a hand held scanner. The scanner permits the animal's leg and foot to be scanned without sedating the animal or fully immobilizing the animal's leg.

Figure 5B:
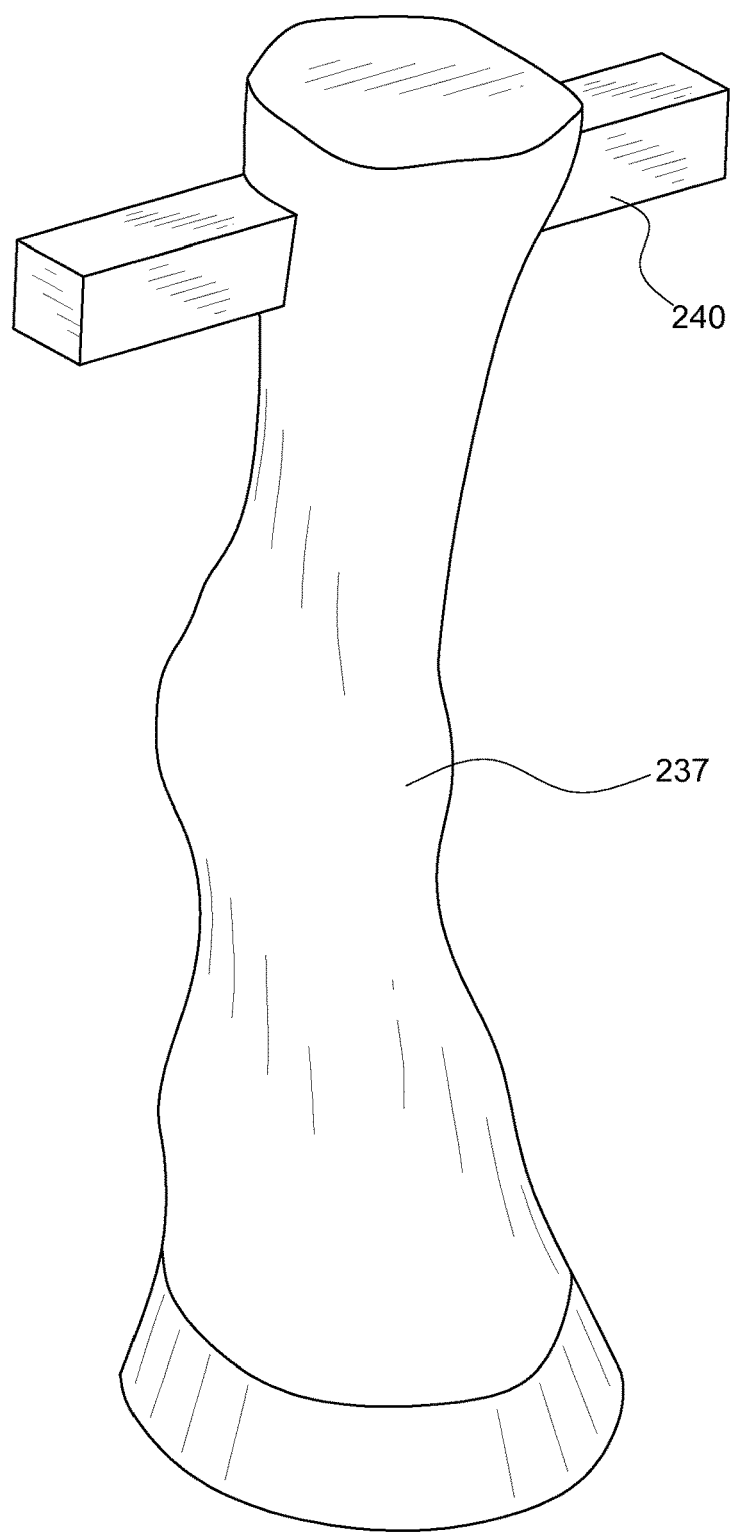
FIG. 5b is a virtual three dimensional facsimile of an horse's leg/hoof with calibrating pin shown according to an embodiment of the present invention.

Using suitable software, the surface of the virtual foot and leg is smoothed and any scanning artifacts or other imperfections are removed and/or repaired as shown in block 410. With reference to block 415, a virtual calibrating pin of a predetermined size and configuration is added near the top of the virtual foot and leg. FIG. 5b is an illustration of the rendered virtual leg 237 of a horse with the calibrating pin 240 added thereto.

Figure 5C:
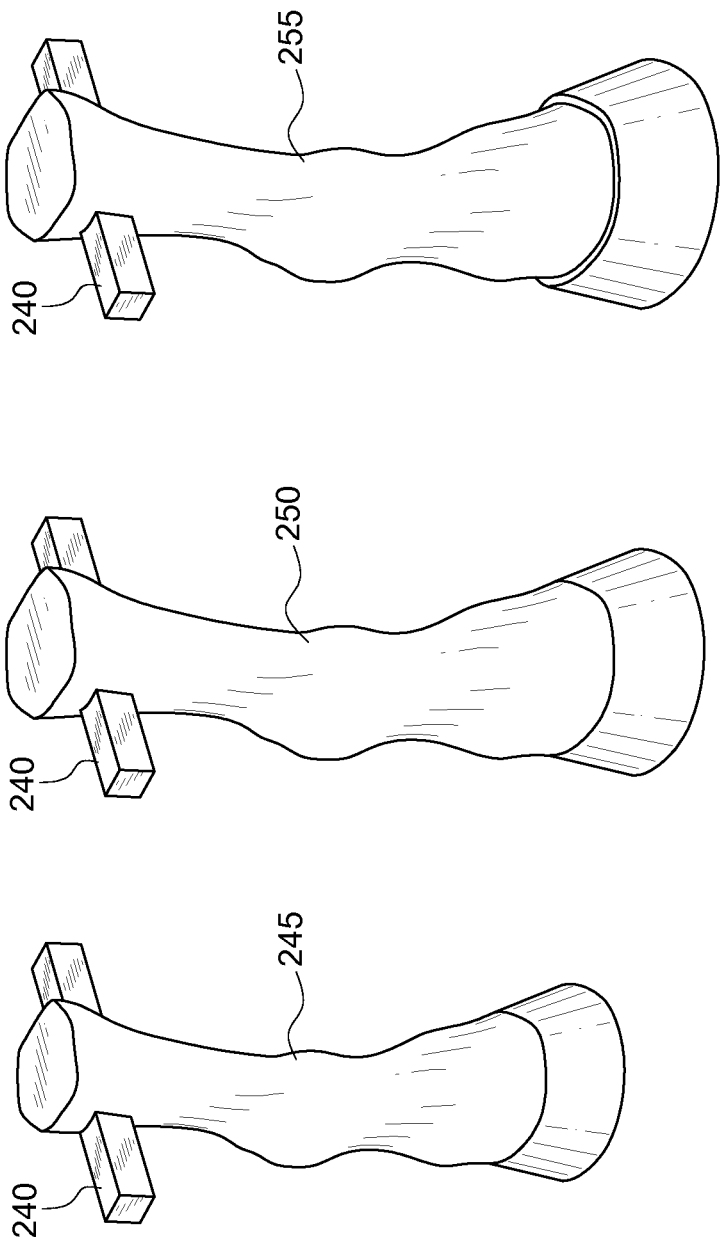
FIG. 5c comprises virtual three dimensional oversized renderings of the horse's leg/hoof with calibrating pin according to an embodiment of the present invention.

As indicated in block 420, modified renderings of the smoothed virtual foot and leg are made that are larger than the virtual foot and leg having selectively modified dimensions relative to the original virtual leg. With reference to FIG. 5c three oversized renderings of the horses leg are illustrated. The first oversized virtual rendering 245 is generally the same size as the virtual foot and leg except for an added thickness under the bottom of the foot. The second oversized virtual rendering 250 is uniformly larger than the first oversized rendering by a predetermined amount. The third oversized virtual rendering 255 is larger than the second oversized rendering primarily only in the region comprising the bottom of the foot and a portion of the sides of the foot that extend upwardly from the bottom thereof. Of note the dimensions of the calibrating pin 240 and the locations of the calibrating pin does not vary in each of the renderings.

With reference to block 425, the virtual foot and leg along with each of the oversized virtual renderings are 3D printed including the calibrating pin of each creating the facsimile and three oversized physical renderings. As indicated in block 430, the prints are sanded to remove imperfections and smooth the surfaces thereof. A protective epoxy coating is also typically applied and once the coating has cured, a suitable release agent is applied to each of the facsimile and the physical renderings.

Figure 5D:
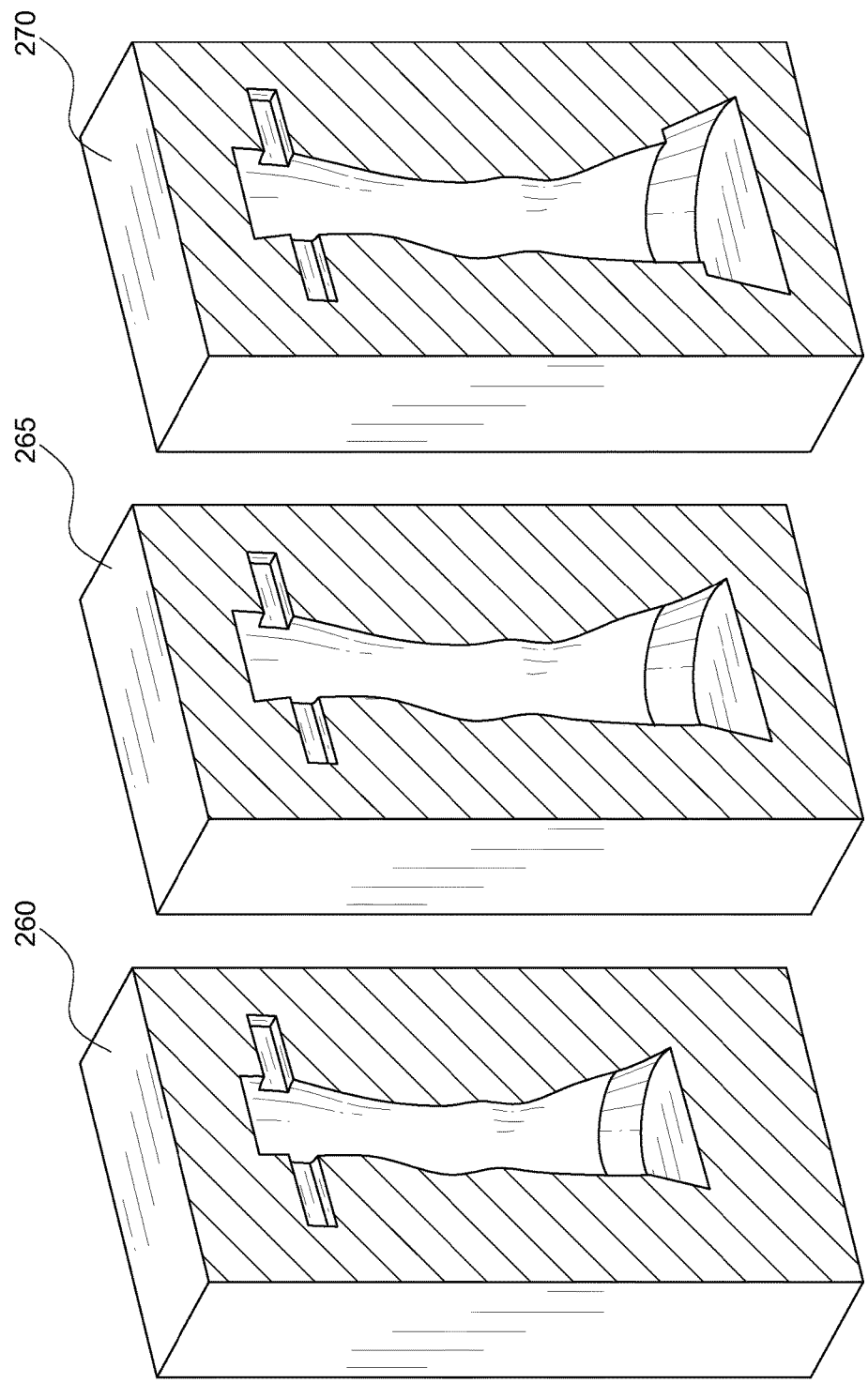
FIG. 5d comprises cross sectional views of three molds fabricated based on the three oversized renderings according to an embodiment of the present invention.

With reference to block 435, female molds 260, 265 & 270 are created using each of the oversized renderings. the molds can be fabricated using any suitable means and materials; however, in one variation the molds are formed over each rendering using an epoxy putty, such as Free Form® AIR Lightweight Epoxy putty made by Smooth-On, inc. of East Texas, Pa. Cross sectional views of the molds are shown in FIG. 5d. The facsimile and the three female molds each of a progressively larger size are used to facilitate the fabrication of the form fit animal boot.

In one variation of the foregoing process, the female molds are directly 3D printed eliminating the need to produce physical oversized renderings, as well as the need to create the female molds from a molding compound.

A First Embodiment Method of Fabricating a Form Fit Therapy Boot

Figure 6A:
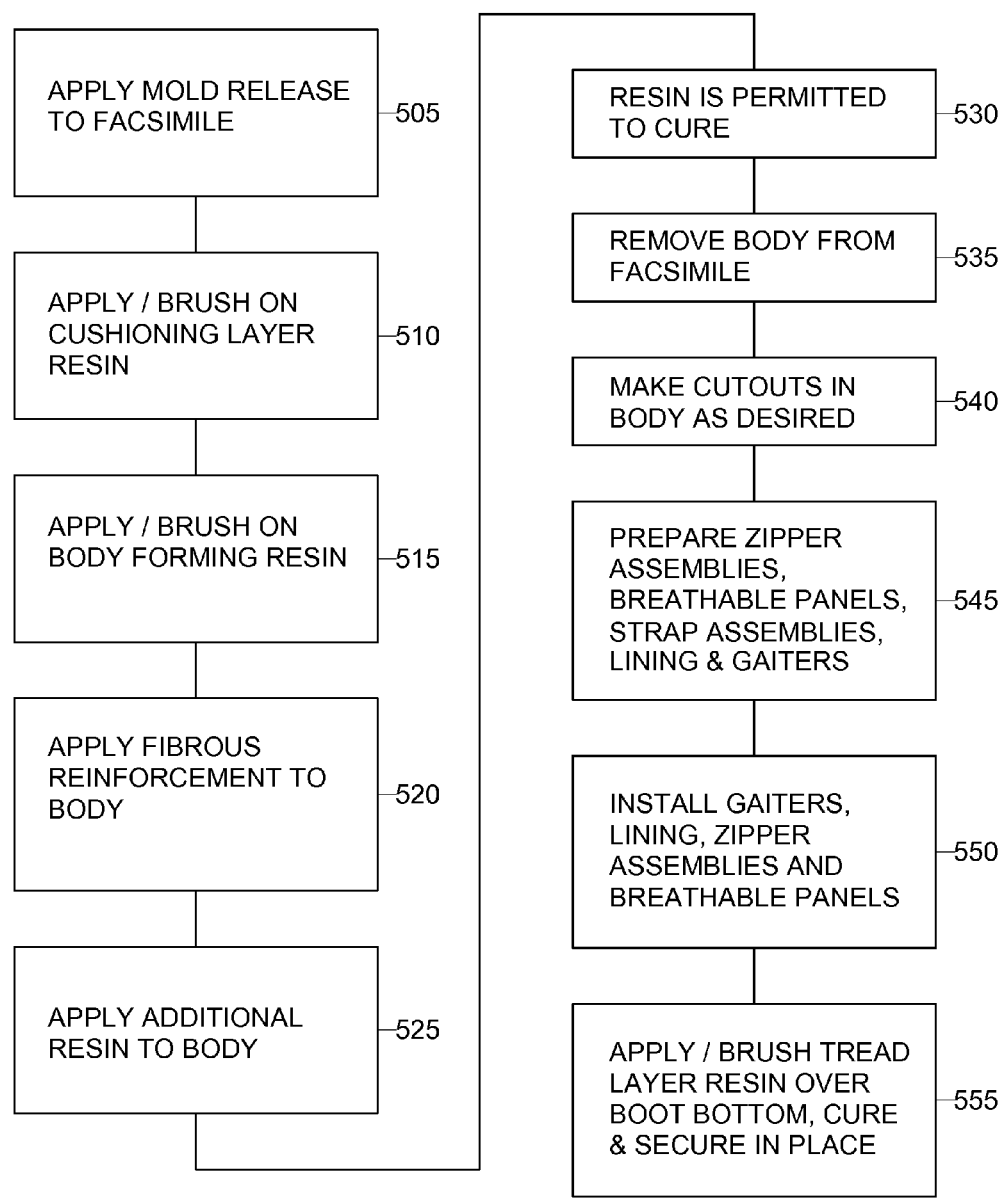
FIG. 6a is flow chart showing a first method of fabricating a boot for an animal's foot or hoof using a facsimile of the foot or hoof according to an embodiment of the present invention.

With reference to the flow chart of FIG. 6A, one method of creating an embodiment of the form fit boot facsimile is described. This process can be used to make a boot using either the plaster cast facsimile produced in the method described with reference to FIG. 3 or with a 3D printed facsimile produced as part of the process described in FIG. 5A. As will become apparent, if a 3D printed facsimile is used with this process, there is no need to print the oversized physical renderings nor is there a reason to create the oversized female molds. Of further note, the use of the calibrating pin is not required on a 3D printed facsimile being used with this method of boot fabrication.

Initially, a mold release of any suitable type, including silicone based releases and wax based releases, is applied to the facsimile as indicated in block 505.

In preparation for boot fabrication, the facsimile is typically inverted and attached to an appropriate supporting structure proximate the end opposite the foot portion. As shown in block 510, the bottom of the foot on the facsimile is coated with layers of an elastomeric resin that cures into a shock absorbing cushion on the boot's bottom. One suitable resin is Ecoflex® 50 supersoft rubber made by Smooth-On, inc. of East Texas, Pa. Several layers of the coating can be applied as desired to build the cushioning layer up to a desired thickness.

Referring to block 515, once the cushioning layer has at least partially cured, the sides and bottom of the facsimile is coated with a second elastomeric resin, typically another silicone, having properties suitable for forming the body of the boot. One suitable resin comprises Smooth Sil 945 by Smooth-On, inc. of East Texas, Pa. Multiple layers can be brushed or toweled on to the facsimile to build the body up to a desired thickness.

In at least some variations as indicated in block 520, the body is also reinforced with a fibrous material. typically, the fibrous material, such as fiberglass cloth, is impregnated with liquid resin and then pressed into place over the previously applied resin. The fibrous material is then encapsulated in the resin when additional layers of resin are applied to the facsimile as indicated in block 525. Once a sufficient thickness of resin has been applied along with any desired reinforcement, the resin is permitted to cure as indicated in block 530. In some variations, the boot is placed in an oven or heat box to facilitate and/or speedup curing.

Once the curing of the boot is sufficiently complete with reference to block 535 the body is removed from the facsimile. The body of the first embodiment boot is cut along one or more generally vertically extending lines from the top edge thereof to a location on the top side of the feet. For the second embodiment boot, the body is typically cut circumferentially around the side of the foot. The cuts permit removal of the boot body from the facsimile typically without destroying or damaging the facsimile. As shown in block 540, ovular cutouts are made in one or more sides of the first embodiment body.

With reference to block 545, zipper assemblies 125 are sized, breathable water impervious fabric panels 110 are cut and boot lining material 135, straps and buckles 130 and the gaiter 120 are prepared. As indicated in blocks 550: the two halves of the gaiter are sewn in place at the top edge of the body; the front and rear zippers are sewn to the sides of the vertically extending cuts in the body and along the edges of the gaiter halves; the one or more strap and buckle assemblies are sewn in place; and the lining material is positioned and secured in the interior of the boot. As applicable, the zipper assembly, the breathable water impervious panels and the gaiter halves can also be adhesively bonded to the body to ensure a water tight seal.

To enhance the longevity of the boot especially when used by the animal in or on abrasive terrain, a tough wear resistant tread layer can be added to the bottom of the boot that extends upwardly along its sides as is indicated in block 555. In at least one variation a polyurethane resin is utilized. The resin in uncured liquid form is brushed onto the bottom of the body with successive layers being added until a desired thickness is achieved. After at least partial cure the top edge of the tread layer is trimmed and then sewn in place over the body portion against which it was formed. Very few materials will bond to silicone other than silicone itself, and wherein the tread layer is not silicone, sewing the tread layer to body prevents its separation therefrom.

A Second Embodiment Method of Fabricating a Form Fit Therapy Boot

Figure 7A:
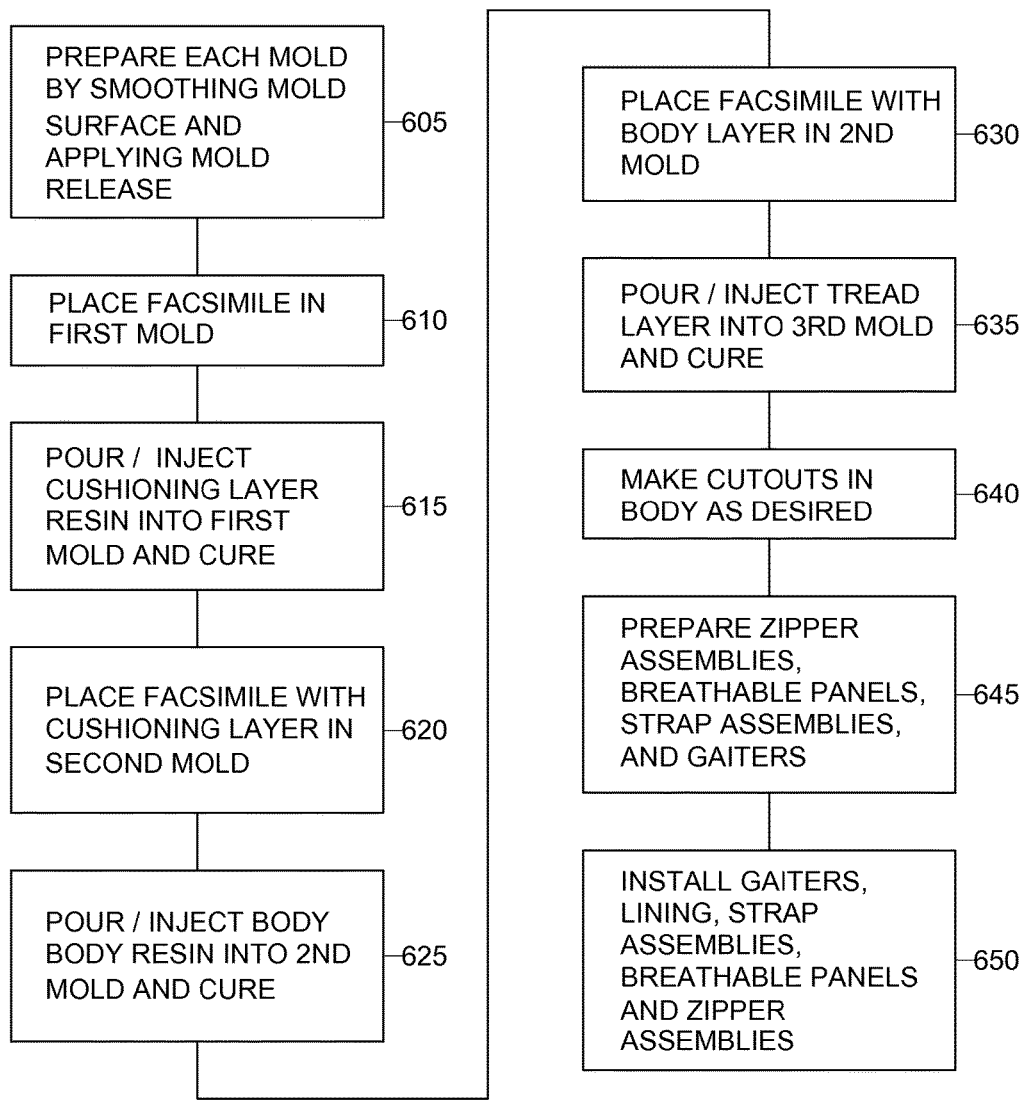
FIG. 7a is flow chart showing a second method of fabricating a boot for an animal's foot or hoof using a facsimile of the foot or hoof according to an embodiment of the present invention.
Figure 7B:
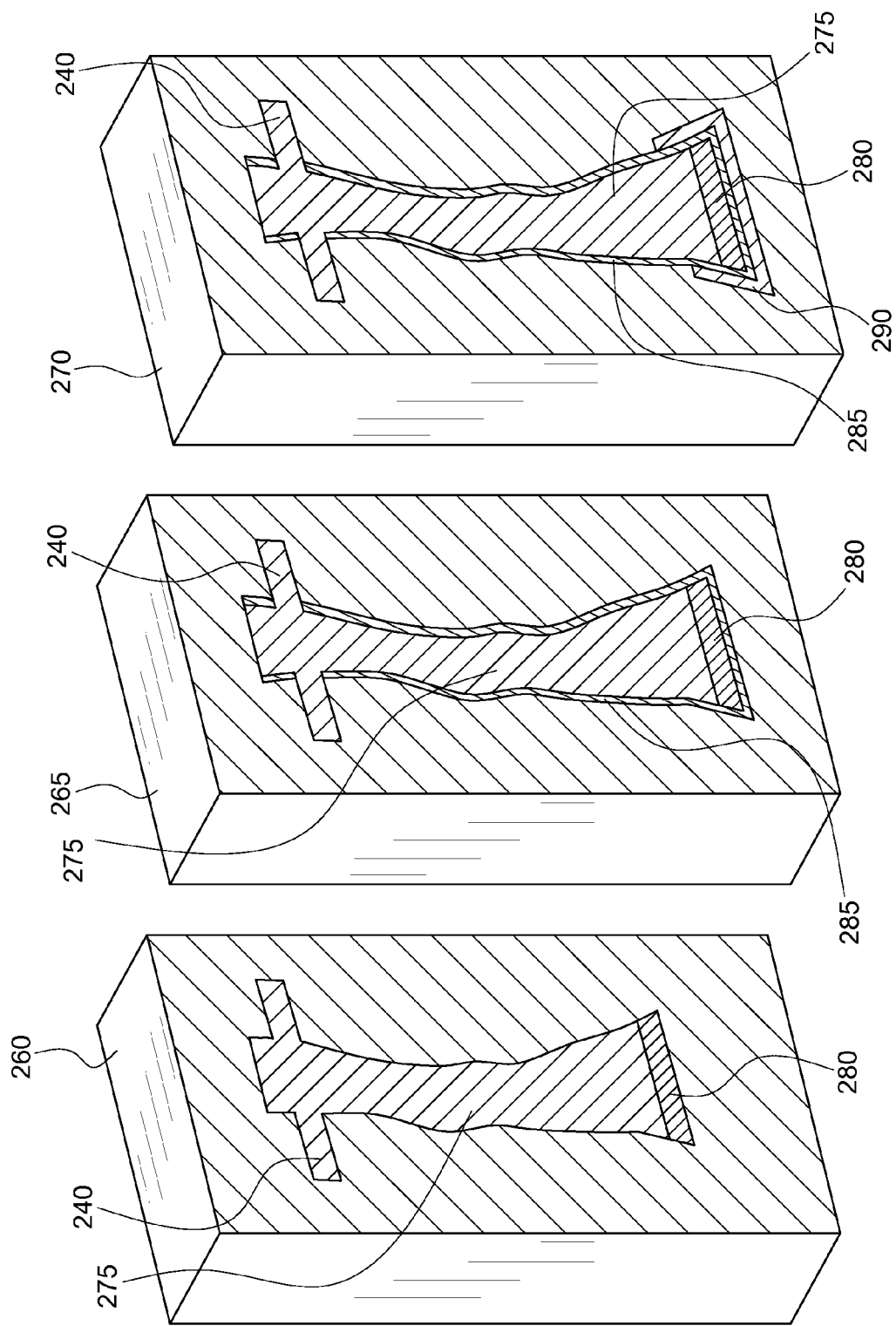
FIG. 7b comprises cross sectional views of three molds fabricated based on the three oversized renderings also including various portions of the boot fabricated by pouring/injecting resin into the boot according to an embodiment of the present invention.

With reference to the flow chart of FIG. 7A, one method of creating an embodiment of the form fit boot facsimile is described. Typically, this method utilizes the 3D printed facsimile and the associated molds (see FIG. 5d) produced pursuant to the second embodiment method of fabricating a facsimile of an animal's foot/hoof as described above.

As indicated in block 605, the facsimile and associated molds are prepared for molding operation by sanding and smoothing the pertinent surfaces and coating them with a suitable mold release. Next as shown in block 610, the facsimile is placed in the first mold 260 using the calibrating pins 240 to position and center the facsimile 275 therein. As indicated in block 615, a resin that will cure into a cushioning material, such as Ecoflex® 50 supersoft rubber, is poured into the mold to fill the provided space between the bottom of the facsimile and the bottom surface of the mold cavity. The elastomer is permitted to cure and then the mold is opened and the facsimile with the cushioning layer 280 attached is removed from the mold.

As indicated by block 620, the facsimile 275 with the cushioning layer 280 attached is placed in the second mold 265 using the calibrating pins 240 to position and center the facsimile therein. As indicated in block 625, the body forming resin, such as Smooth Sil 945 by Smooth-On, inc. of East Texas, Pa., is poured into the mold to fill the provided space between the bottom and sides of the combination of the facsimile and the cushion layer the bottom surface and side surfaces of the mold cavity. The elastomer is permitted to cure and then the mold is opened and the facsimile with the boot body forming layer 285 attached is removed from the mold.

As indicated by block 630, the facsimile 275 with the cushioning layer 280 and body layer 285 formed thereo is placed in the third mold 270 using the calibrating pins 240 to position and center the facsimile therein. As indicated in block 635, a polyurethane resin or other resin that will cure into a toughened tread layer 290 is poured into the mold to fill the provided space between the bottom and immediately adjacent side surfaces of the body and the corresponding bottom surface and opposing side surfaces of the mold cavity. The tread layer resin is permitted to cure and then the mold is opened and the facsimile with the formed boot is removed from the mold.

The boot produced using the second embodiment method does not include the application of a fibrous reinforcement layer. Rather, a resin chosen to comprise the body that has sufficient strength and other physical properties as to make the reinforcement layer unnecessary. In some variations, a virgin resin itself may possess the necessary properties, but in other variations fumed silica, short cut fibers of fiberglass, aramid or carbon, or other fillers may be mixed with the resin to increase its strength and toughness. Variations of the second embodiment method are also contemplated wherein additional step are incorporated in the process perhaps incorporating a fourth mold wherein between the insertion of the facsimile between second and third molds a layer or layers of fibrous reinforcing material are applied to the surface of a partially formed boot body.

After removing the boot from the last mold, the boot is processed in a manner similar to the boot fabricated using the first embodiment method. The body of a first embodiment boot is cut along one or more generally vertically extending lines from the top edge thereof to a location on the top side of the feet. For the second embodiment boot, the body is typically cut circumfrencially around the side of the foot. The cuts permit removal of the boot body from the facsimile typically without destroying or damaging the facsimile. As shown in block 640, ovular cutouts are made in one or more sides of the first embodiment body.

With reference to block 645, zipper assemblies 125 are sized, breathable water impervious fabric panels 110 are cut and boot lining material 135, straps and buckles 130 and the gaiter 120 are prepared. As indicated in blocks 650: the two halves of the gaiter are sewn in place at the top edge of the body; the front and rear zippers are sewn to the sides of the vertically extending cuts in the body and along the edges of the gaiter halves; the one or more strap and buckle assemblies are sewn in place; and the lining material is positioned and secured in the interior of the boot. As applicable, the zipper assembly, the breathable water impervious panels and the gaiter halves can also be adhesively bonded to the body to ensure a water tight seal. The tread layer is also sewn to the body typically proximate its top edge.

Treating an Animal Using Embodiments of the Boot

The boots can be adapted for use with a variety of animals and are particularly advantageous for use with animals that are particularly resistant to wearing foot coverings including traditional bandages and prior art boots. The form fit nature of the boot when properly secured to the foot or hoof using one or more straps and one or more zippered closures, makes it particularly difficult for most animals to remove. Furthermore, because of their form fitting nature, embodiments of the boots tend to be more comfortable than prior art solutions lessening the ardor and determination an animal may apply in trying to remove the boots. Specific animals to which the boots may be used include, but are not limited to, Pachyderms including rhinoceros, horses, and dogs.

Specifically concerning rhinoceros, they have been known to suffer damage to their hooves. Often when exposed to a zoo environment, the hooves and surrounding tissue have been known to become infected, which has proven very difficult to cure as long as the animal remains exposed to the conditions that gave rise to the infection in the first place. Often such an infection can be life threatening. The boots described herein provide a means for maintaining the cleanliness of the hoof and foot and permit healing without undue risk of a life threatening infection.

The boots can be quickly placed on and removed from an animal making it possible to use the boots with moderately cooperative zoo animals without sedation.

To install either the first or second embodiment boot, the front and back zippers are opened and the sides of the boot are splayed apart. In some variations a gel insert insole can be added to further cushion an injured foot. The boot is placed over the applicable foot of the animal and the zippers are closed to secure the boot to the foot. The strap/buckle assemblies are secured and adjusted to further secure the boot to the foot. For example, when used on a cooperative rhinoceros, the boot can be applied in a about 10 minutes or so permitting its easy removal and re-application as necessary in the treatment of the foot.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method of making a form fitting water resistant boot for a foot of an animal, the method comprising:
    fabricating a facsimile of the foot;
    smoothing out any imperfections and roughness on the surface of the facsimile;
    applying a release agent to the facsimile;
    applying a resin of an elastomeric material to the surface of the facsimile;
    curing the resin of the elastomeric material to form a boot;
    cutting at least one generally vertically extending first slit from a top edge downwardly in the boot;
    removing the boot off of the facsimilie; and
    installing at least one zipper assembly in the at least one first slit.

2. The method of claim 1, wherein said fabricating a facsimile of the foot comprises:
    scanning the foot and generating a first digital three dimensional foot rendering; and
    printing the first digital three dimensional foot rendering to create the facsimilie.

3. The method of claim 2, wherein said applying a resin of an elastomeric material to the surface of the facsimile comprises:
    generating at least a second digital three dimensional foot rendering from the first digital three dimensional foot rendering wherein one or more dimensions of the second digital three dimensional foot rendering are selectively enlarged relative the first digital three dimensional foot rendering;
    printing the second digital three dimensional foot renderings to create a first foot mold blank;
    fabricating a first female mold using the first foot mold blank;
    positioning the facsimile in the first female mold; and
    injecting the resin in a space between the facsimile and the first female mold.

4. The method of claim 1, wherein said fabricating a facsimile of the foot comprises:
    brushing a first layer of elastomeric resin on the foot;
    applying at least one elongated magnetic strip assembly over the first layer, the magnetic strip assembly having left and right sections configured to magnetically connect with each other at a seam, each of the left and right sections having flanges that extend laterally outwardly of the seam;
    applying resin coated fiberous reinforcement over the first layer overlapping flanges of the magnetic strip assembly but not covering the seam;
    brushing on additional layers of elastomeric resin over the reinforcing fabric, first layer and the magnetic strip assembly;
    curing the elastomeric resin to create a female foot mold;
    removing the mold from the foot by cutting the cured resin over the seam, separating the left and right sections at the seam, and pulling the female foot mold from the foot;
    creating the facsimile by pouring a suitable casting material into the female foot mold and permitting it to cure; and
    removing the facsimile from the mold.

5. The method of claim 4, wherein the elastomeric resin comprises a rapid cure silicone resin, and the suitable casting material comprises a plaster.

6. The method of claim 4, wherein said applying a resin of an elastomeric material to the surface of the facsimile comprises brushing multiple layers of resin on to the facsimile.

7. The method of claim 1, further comprising applying a fiberous reinforcing material to the resin.

8. The method of claim 1, further comprising cutting one or more cutouts into the boot and covering the one or more openings with a breathable water impervious panel.

9. The method of claim 1, further comprising applying a polymeric tread layer to a bottom of the boot.

* * * * *